United States Patent Office 2,945,864
Patented July 19, 1960

2,945,864

METHOD OF PREPARING ACETAL AND ACETAL-LIKE COMPOUNDS

Nicholas B. Lorette, Lake Jackson, Tex., assignor to The Dow Chemical Company, Midland, Mich., a corporation of Delaware No Drawing. Filed Mar. 21, 1958, Ser. No. 722,855

3 Claims. (Cl. 260—340.6)

The present invention relates to a new and useful method of producing unsymmetrical acetals and acetal-like compounds. More particularly, the present invention relates to a method for the preparation of 4-chlorobutyl acetals, i.e., the 2-(4-chlorobutoxy)tetrahydrofurans, the 4-chlorobutyl alkyl acetals and mono- and 2,3-bis(4-chlorobutoxy)p-dioxanes. The compounds, prepared in accordance with the present invention, may be characterized by the general formula

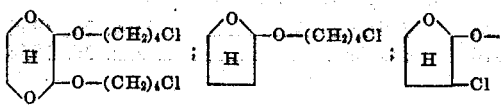

and

R—O—CH—O—(CH$_2$)$_4$Cl
　　　|
　　　R$_1$ wherein R represents an alkyl radical having from 1 to 8 carbon atoms, inclusive and R' represents hydrogen or an alkyl radical having from 1 to 8 carbon atoms inclusive.

It has now been found that an alpha halo ether will cleave the tetrahydrofuran ring to form the corresponding chlorobutoxy ether compound. The reaction is illustrated as follows:

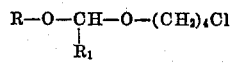

The process is carried out in the presence of from 2 to 20 mole percent of zinc chloride based on the alpha chloro ether employed and at a temperature of from 50° to 125° C. It is usually desirable, though not necessary, to use a substantial excess of tetrahydrofuran, such as 1.5 to 3.0 times the theoretical amount. The reaction is preferably carried out at the reflux temperature of the reaction mixture to obtain optimum yields of the desired product provided such temperature is in the range of 50°–125° C. Higher temperatures and pressure may be employed but are usually not convenient. Upon completion of the reaction, the desired product may be obtained by, for example, fractional distillation of the reaction mixture under reduced pressure.

In accordance with the present invention an alpha-chloro ether of the formula

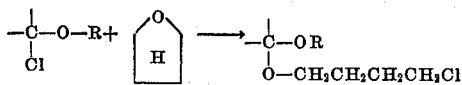

wherein R represents an alkyl radical having from 1 to 8 carbon atoms, inclusive, and R' represents hydrogen or an alkyl radical having from 1 to 8 carbon atoms inclusive, is reacted, by contacting, with a tetrahydrofuran compound in the presence of from 2 to 20 mole percent of zinc chloride at a temperature of from about 50° C. to about 125° C. and preferably at the reflux temperature of the reaction mixture. Upon completion of the reaction, the excess reactants conveniently may be removed and recovered by fractional distillation of the reaction mixture under reduced pressure, and the residue, containing the desired product, washed with water to remove the zinc chloride, and then fractionally distilled to obtain the desired product as a high-boiling fraction. Some of the alpha chloro ether compounds which fall within the scope of the definitive formula and are useful as starting materials in the present invention are, for example, 2,3-dichloro-para-dioxane, alpha-chloroethyl ethyl ether, alpha chloroethyl methyl ether, 2-chlorotetrahydrofuran, 2,3-dichloro-tetrahydrofuran, alpha-chloropropyl methyl ether, alpha-chlorobutyl butyl ether, alpha-chloroethyl butyl ether, 1-chloro-2-methylbutyl methyl ether, and the like.

The following examples illustrate the present invention but are not to be construed as limiting.

EXAMPLE 1

*2,3-bis(4'-chlorobutoxy)-p-dioxane*

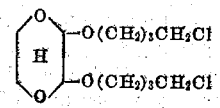

A mixture of 300 ml. (3.7 moles) of tetrahydrofuran, 157 grams (1 mole) of 2,3-dichlorodioxane and 5 grams of zinc chloride was heated at the reflux temperature for 3.5 hours. The temperature of the reaction mixture slowly rose from an initial 75° C. to 95° C. Upon completion of the reaction the excess tetrahydrofuran was removed by fractional distillation at 200 mm. pressure. The still-bottoms were added to 400 ml. of carbon tetrachloride; washed six times with water to remove the zinc chloride and finally fractionally distilled under reduced pressure to remove the carbon tetrachloride and to obtain a 2,3-bis(4'-chlorobutoxy)-p-dioxane fraction boiling at 165° C. at 0.5 mm. pressure. The product had an index of refraction at 25° C. of 1.4725 and a density, at 25°/4° C. of 1.188; yield, 43 percent.

Analysis for $C_{12}H_{22}O_4Cl_2$:

|  | C | H | Cl |
|---|---|---|---|
| Calc | 47.82 | 7.33 | 23.6 |
| Found | 47.74 | 7.47 | 23.3 |

EXAMPLE 2

In a like manner as the foregoing example, employing 20 grams of zinc chloride in place of 5 grams, the reaction was found to be complete in 45 minutes. The yield was 43 percent and the product had the same physical properties as the product of Example 1.

EXAMPLE 3

*Alpha(4-chlorobutoxy)ethyl ethyl ether*

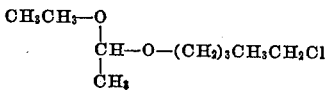

In a similar manner as Example 1, employing alpha-chloroethyl ethyl ether instead of dichlorodioxane, there was obtained an alpha (4-chlorobutoxy)ethyl ethyl ether product.

EXAMPLE 4

*2-(4'-chlorobutoxy)-3-chlorotetrahydrofuran*

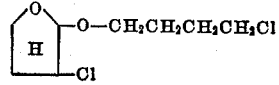

One mole of 2,3-dichlorotetrahydrofuran was added to 3 moles of tetrahydrofuran in which 20 g. of freshly fused $ZnCl_2$ was dissolved. The reaction was somewhat vigorous at 70–80° C. After about 10 minutes when the reaction had subsided, heat was applied and the pot contents maintained at reflux (90–93° C.) temperature for an additional 15 minutes. The material was washed with water, dried with $Na_2SO_4$ and distilled under reduced pressure to give a 53 percent yield of 2-(4'-chlorobutoxy)-3-chlorotetrahydrofuran having a boiling point of 107° C. at 5 mm. pressure. The product was found to have an index of refraction at 24° C. of 1.4700 and a density at 24° C. of 1.195.

A control experiment was run using the same ratio of reactants but without $ZnCl_2$. There was no reaction after 4 hours of refluxing at 76° C.

Another aspect of the present invention is the finding that 2,3-dichlorotetrahydrofurans may act as both the alpha-chloroether compound and the tetrahydrofuran reactant and when reacted in accordance with the present invention produce a polymeric material.

I claim:

1. A process for the preparation of 2,3-bis-(4-chlorobutoxy)-p-dioxane which comprises the steps of contacting tetrahydrofuran and 2,3-dichloro-p-dioxane at a temperature of from 50°–125° C. and in the presence of about 2 to 20 mole percent of zinc chloride.

2. A process for the preparation of alpha(4-chlorobutoxyl)-ethyl ethyl ether which comprises the steps of contacting tetrahydrofuran and alpha-chloroethyl ethyl ether at a temperature of from 50°–125° C. and in the presence of about 2 to 20 mole percent of zinc chloride.

3. A process for the preparation of an alpha (4-chlorobutoxy) ether which comprises the steps of contacting tetrahydrofuran with a compound selected from the group consisting of

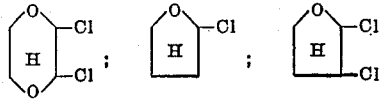

and

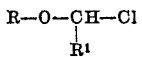

wherein R represents an alkyl radical having from 1 to 8 carbon atoms inclusive, and R' represents a member selected from the group consisting of hydrogen and alkyl radicals having from 1 to 8 carbon atoms, inclusive, at a temperature of from 50° to 125° C. in the presence of about 2 to 20 mole percent of zinc chloride, based on the compound employed, to replace the chlorine of the compound with an omega-chlorobutoxy radical.

References Cited in the file of this patent

UNITED STATES PATENTS

| | | |
|---|---|---|
| 2,532,044 | Walker | Nov. 28, 1950 |
| 2,667,516 | Bauman | Jan. 26, 1954 |